United States Patent
Huang

(10) Patent No.: US 11,254,383 B1
(45) Date of Patent: Feb. 22, 2022

(54) BICYCLE HANGER

(71) Applicant: YOTTA INNOVATION CO., LTD., Apia (WS)

(72) Inventor: Stella Huang, Taipei (TW)

(73) Assignee: YOTTA INNOVATION CO., LTD., Apia (WS)

( * ) Notice: Subject to any disclaimer, the term of this patent is extended or adjusted under 35 U.S.C. 154(b) by 0 days.

(21) Appl. No.: 17/143,647

(22) Filed: Jan. 7, 2021

(51) Int. Cl.
*B62H 3/12* (2006.01)

(52) U.S. Cl.
CPC ..................................... *B62H 3/12* (2013.01)

(58) Field of Classification Search
CPC .... B62H 6/12; B62H 3/02; B62H 3/00; A47B 46/00; A47F 5/01; A47F 5/0037; A47F 5/08
See application file for complete search history.

(56) References Cited

U.S. PATENT DOCUMENTS

| | | | | |
|---|---|---|---|---|
| 572,770 | A * | 12/1896 | Putnam | B62H 3/12 211/19 |
| 10,822,045 | B1 * | 11/2020 | Shen | B62H 3/02 |
| 2007/0012634 | A1 * | 1/2007 | Huang | B60R 9/10 211/17 |
| 2007/0107322 | A1 * | 5/2007 | Blume | E04H 6/005 52/79.4 |
| 2014/0326767 | A1 * | 11/2014 | Nelson | B62K 19/40 224/502 |

* cited by examiner

*Primary Examiner* — Hiwot E Tefera
(74) *Attorney, Agent, or Firm* — Muncy, Geissler, Olds & Lowe, P.C.

(57) ABSTRACT

A bicycle hanger is provided, including: a base, configured to be mounted to an object; and two supporting units, connected to the base, each supporting unit including a supporting arm, positioning notches, a positioning member and an elastic member, each supporting arm being rotatably connected to the base by a pivot member, one of the base and the supporting arm including the positioning notches and the other including the positioning member, the positioning notches being angularly arranged in interval relative to the pivot member, the positioning member being radially movable relative to the pivot member and releasably engageable within one of the positioning notches, an end of the elastic member being connected with the positioning member, another end of the elastic member being connected with one of the base, the supporting arm and the pivot member, the elastic member biasing the positioning member radially and inwardly.

8 Claims, 10 Drawing Sheets

BICYCLE HANGER

BACKGROUND OF THE INVENTION

Field of the Invention

The present invention relates to a bicycle hanger.

Description of the Prior Art

Most bikes can be parked by their parking mechanism. However, some bikes such as road bikes, mountain bikes are provided without parking mechanism because of professional factors such as racing safety, lightweight and other professional factors. Therefore, a positioning device is required when there is a need for resting or repairing the bicycle. TW M577390, TW 1619630, TW 1504489 and TW M507884 each disclose a positioning device for bicycle.

However, the positioning device or bicycle rack mentioned in the aforementioned patent has shortcomings. For example, the positioning frame of TW M507884 has a fixed configuration, so it can only lean against the specific position of the bicycle, and cannot be used for other types of bikes. The rack of TW 1504489 is foldable, but it still has a specific configuration when unfolded (as shown in FIG. 7), which has the same shortcoming as that of TW M507884. The rack of TW 1619630 also has a specific configuration, which has the same shortcoming as that of TW M507884. The rack of TW M577390 is used to hold the tire of the bicycle, so it can be applied to most bicycles; however, its positioning effect is not good, so the bicycle handle and frame are prone to be unstable. In addition, the above-mentioned devices lack proper pivot mechanism and cannot be widely applied and easily adjusted.

The present invention is, therefore, arisen to obviate or at least mitigate the above-mentioned disadvantages.

SUMMARY OF THE INVENTION

The main object of the present invention is to provide a bicycle hanger which is quickly and angularly adjustable to support a bicycle.

To achieve the above and other objects, the present invention provides a bicycle hanger, including: a base, configured to be mounted to an object; and two supporting units, connected to the base, each of the two supporting units including a supporting arm, a plurality of positioning notches, a positioning member and an elastic member, each said supporting arm being rotatably connected to the base by a pivot member, one of the base and the supporting arm including the plurality of positioning notches, the other of the base and the supporting arm including the positioning member, the plurality of positioning notches being angularly arranged in interval relative to the pivot member, the positioning member being radially movable relative to the pivot member and releasably engageable within one of the plurality of positioning notches, an end of the elastic member being connected with the positioning member, another end of the elastic member being connected with one of the base, the supporting arm and the pivot member, the elastic member biasing the positioning member radially and inwardly.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
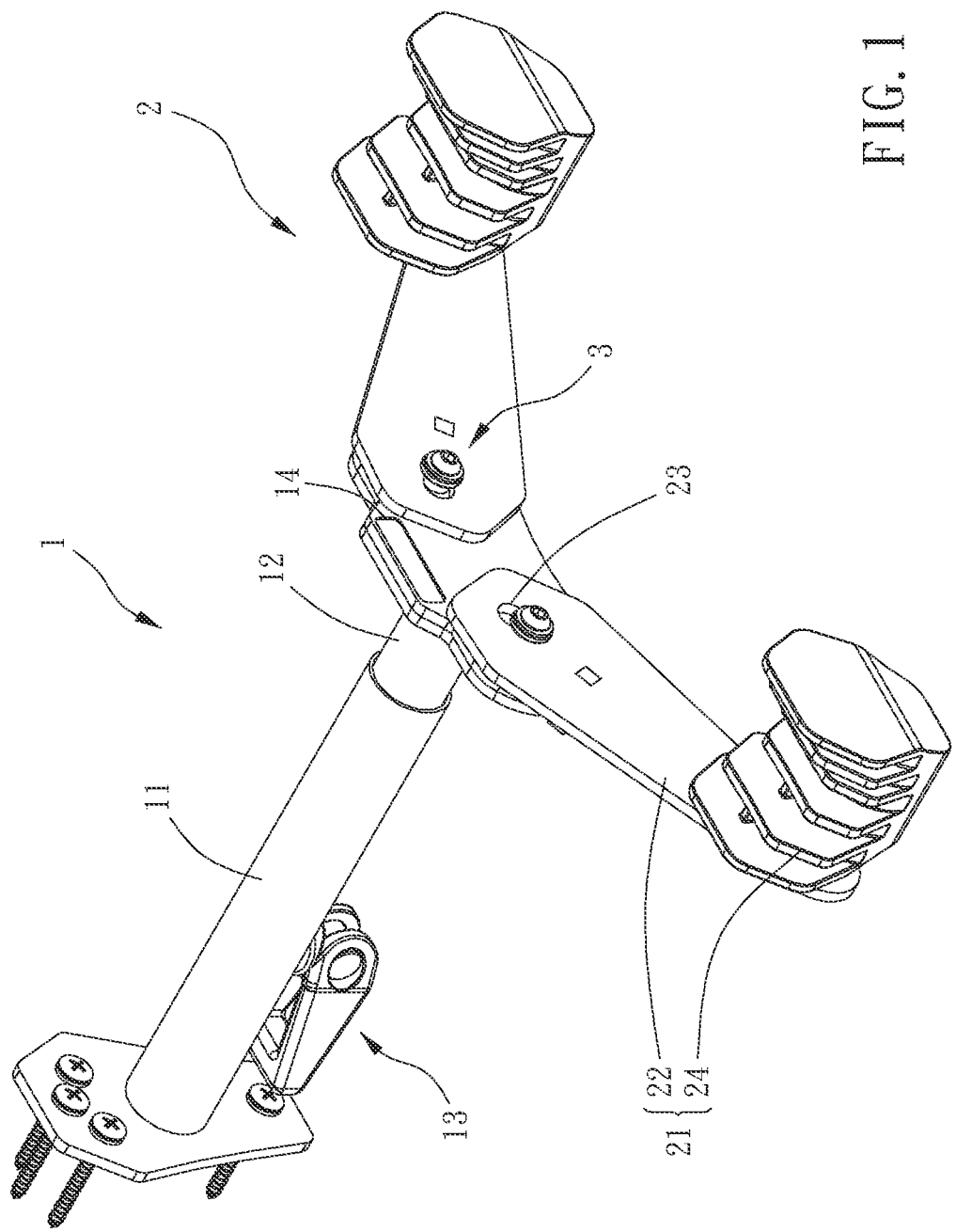
FIG. 1 a stereogram of a preferable embodiment of the present invention.
Figure 2:
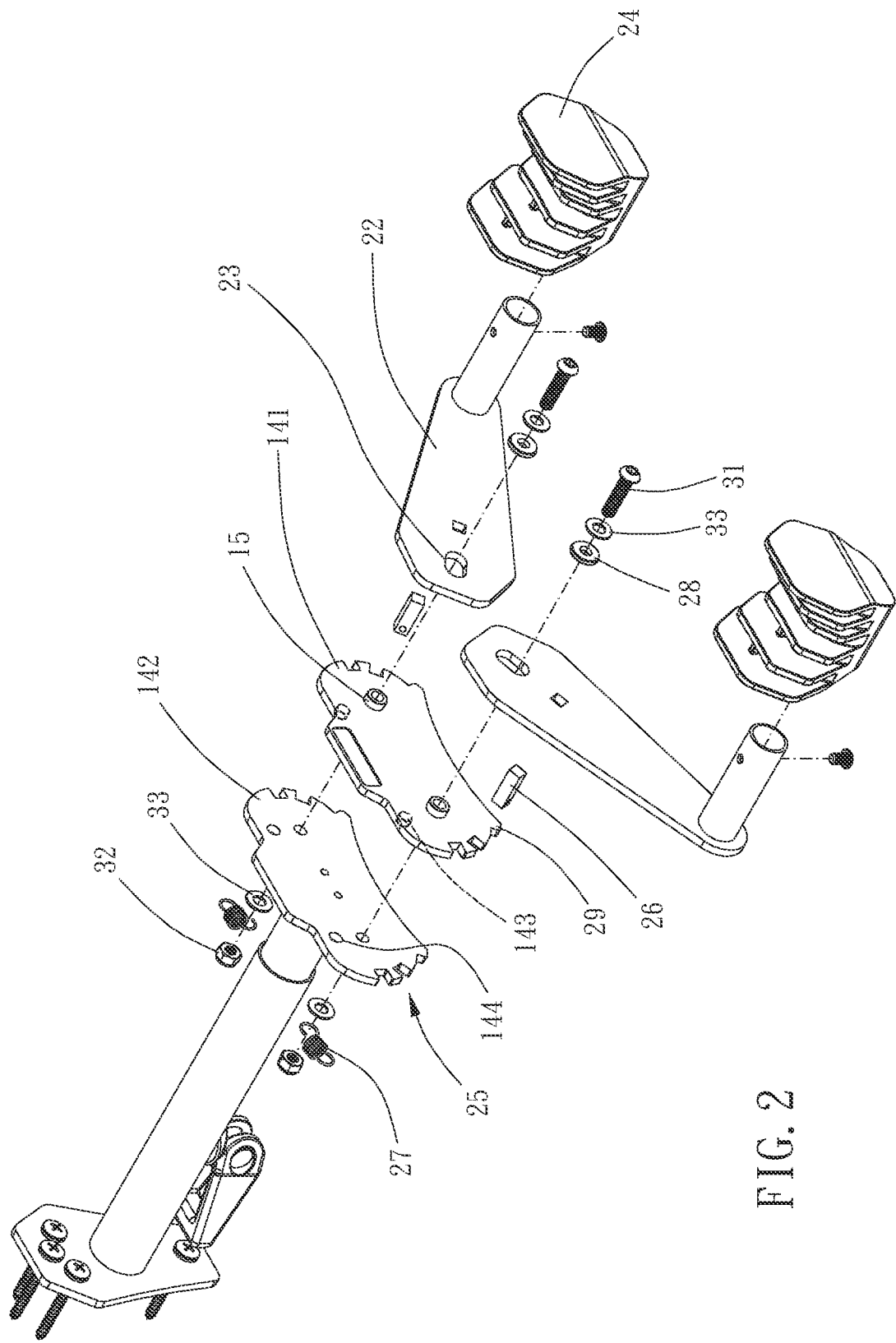
FIG. 2 is a breakdown drawing of FIG. 1.
Figure 3:
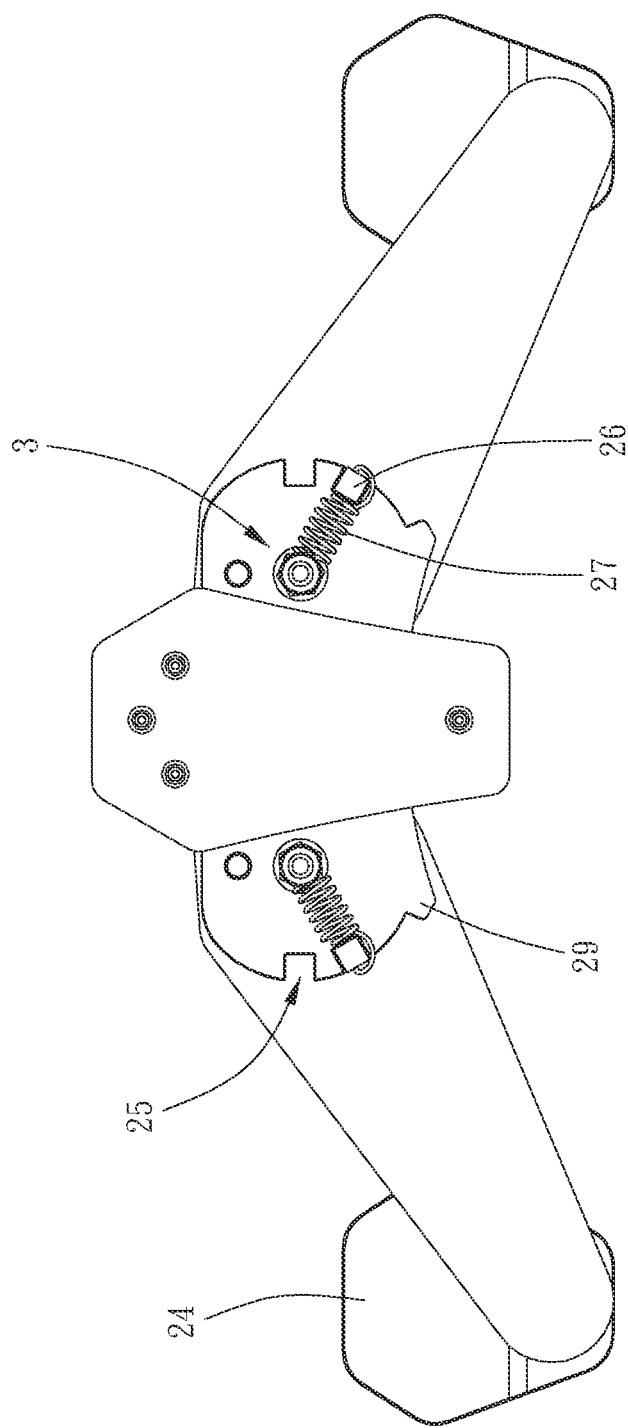
FIGS. 3-6 are drawings showing operation according to a preferable embodiment of the present invention.
Figure 4:
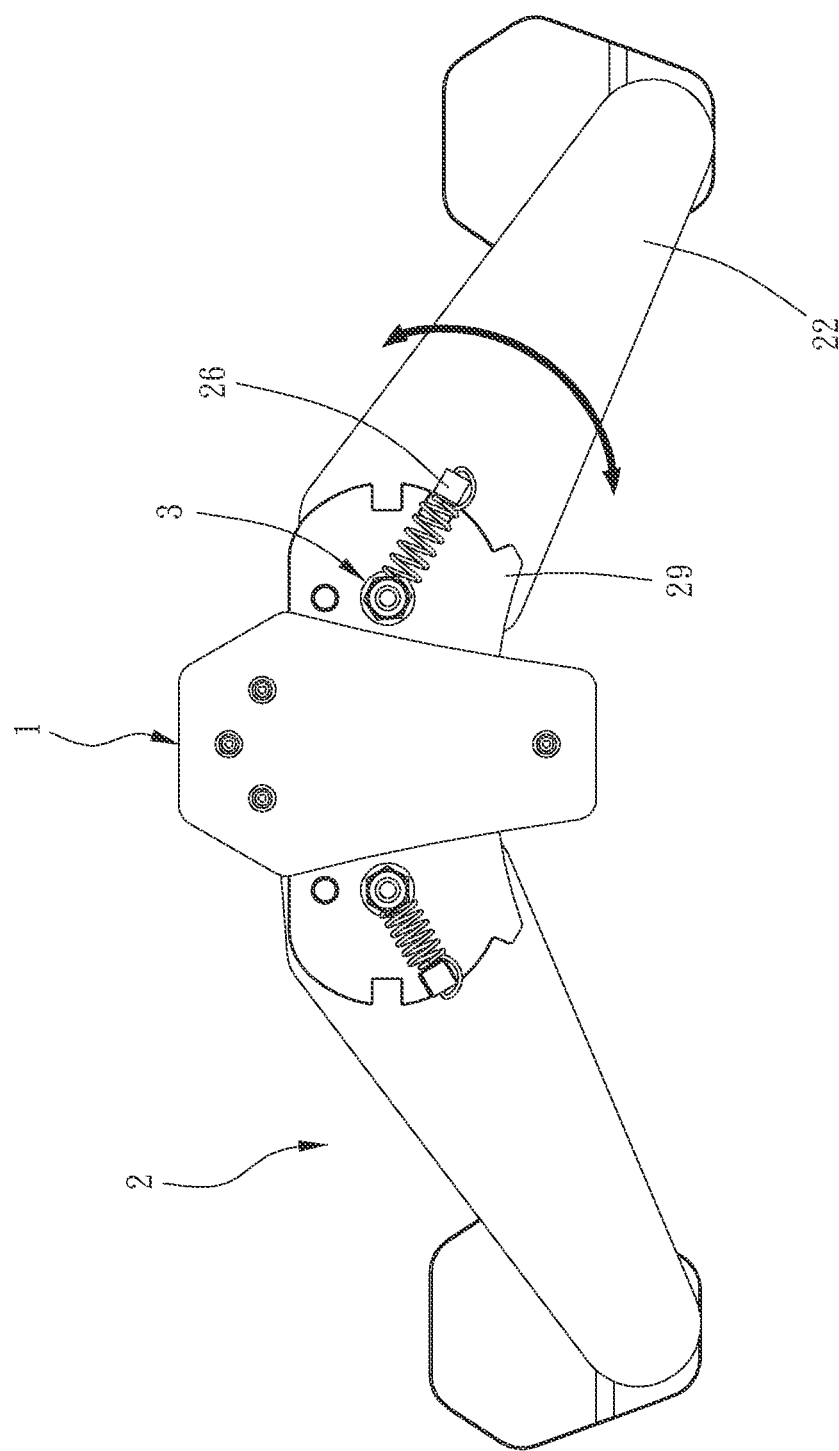
Figure 5:
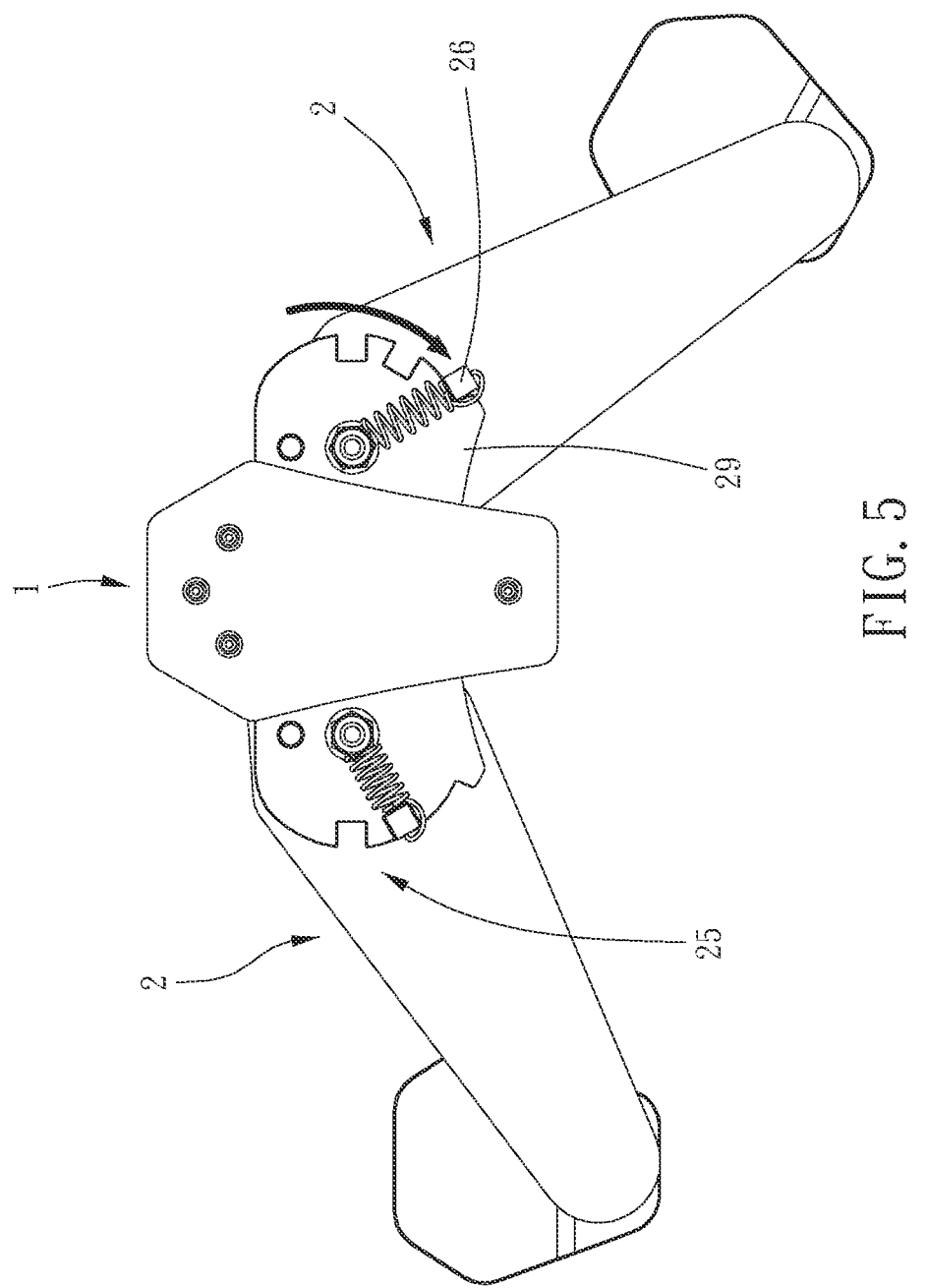
Figure 6:
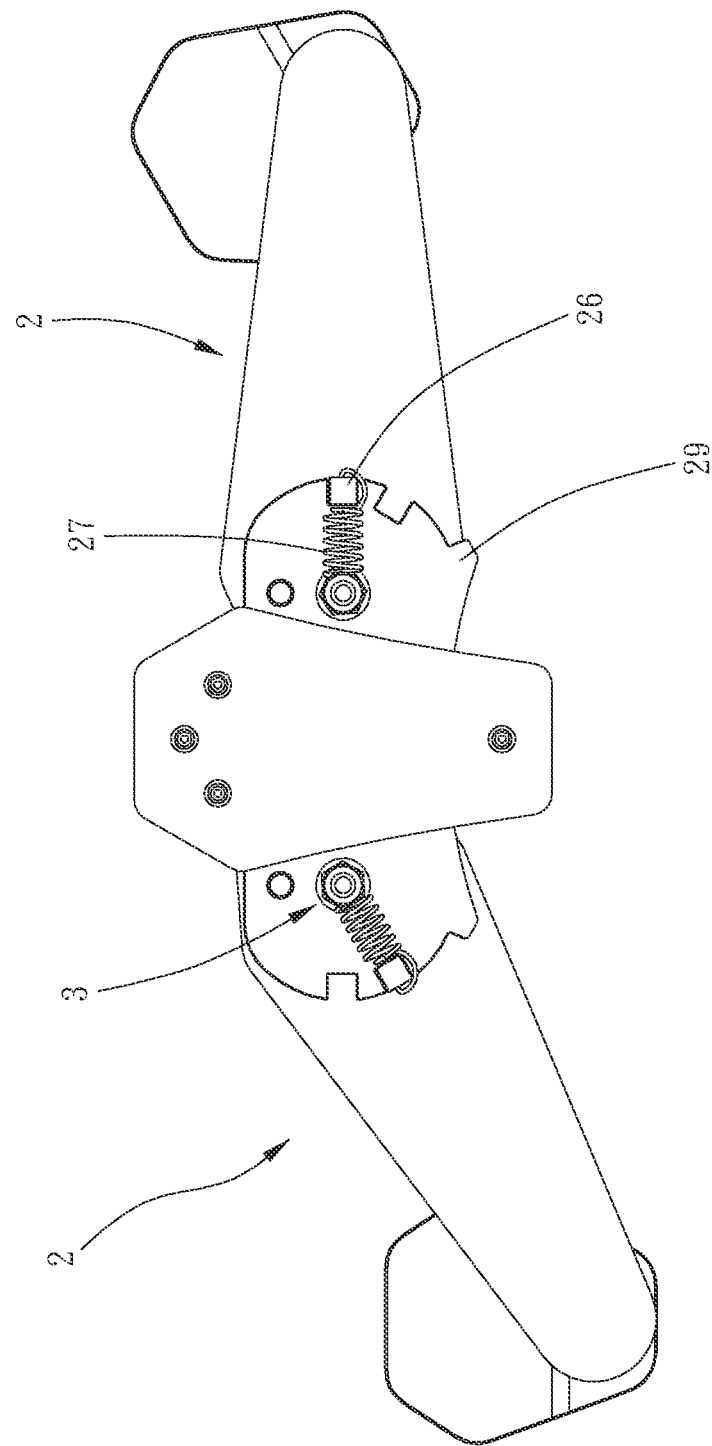
Figure 7:
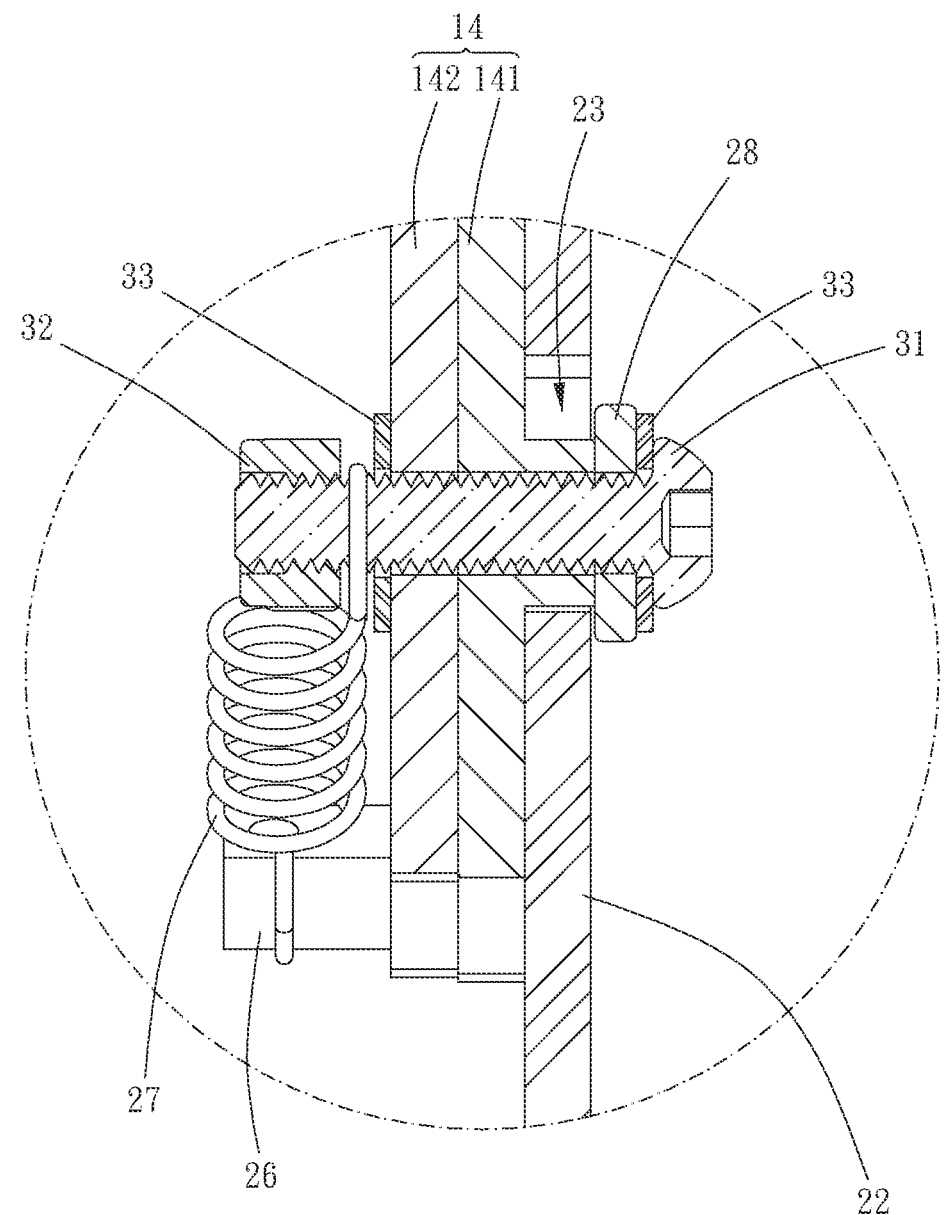
FIG. 7 is a partial enlargement of a preferable embodiment of the present invention.
Figure 8:
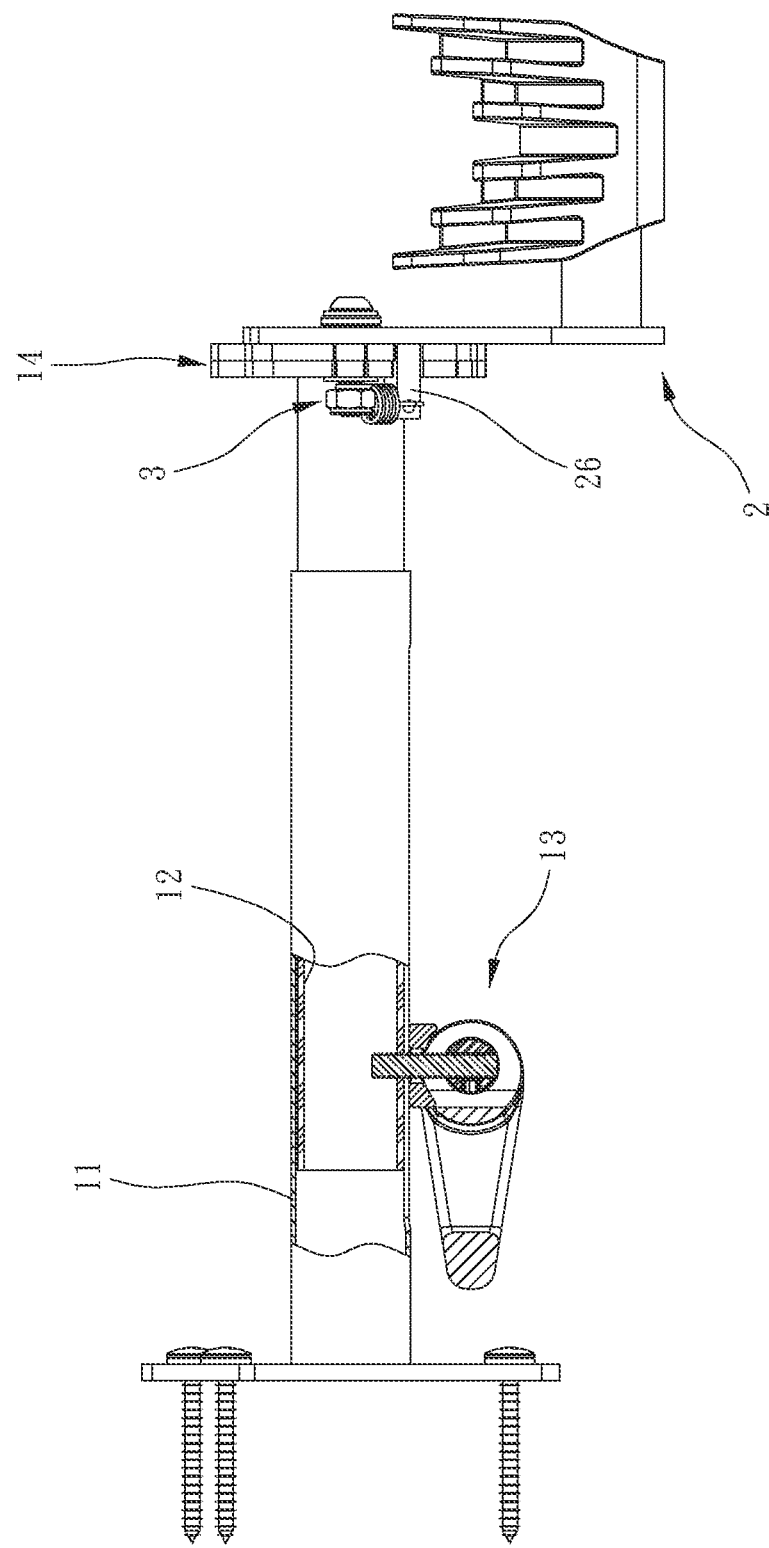
FIGS. 8 and 9 are drawings showing operation of an urging mechanism according to a preferable embodiment of the present invention.
Figure 9:
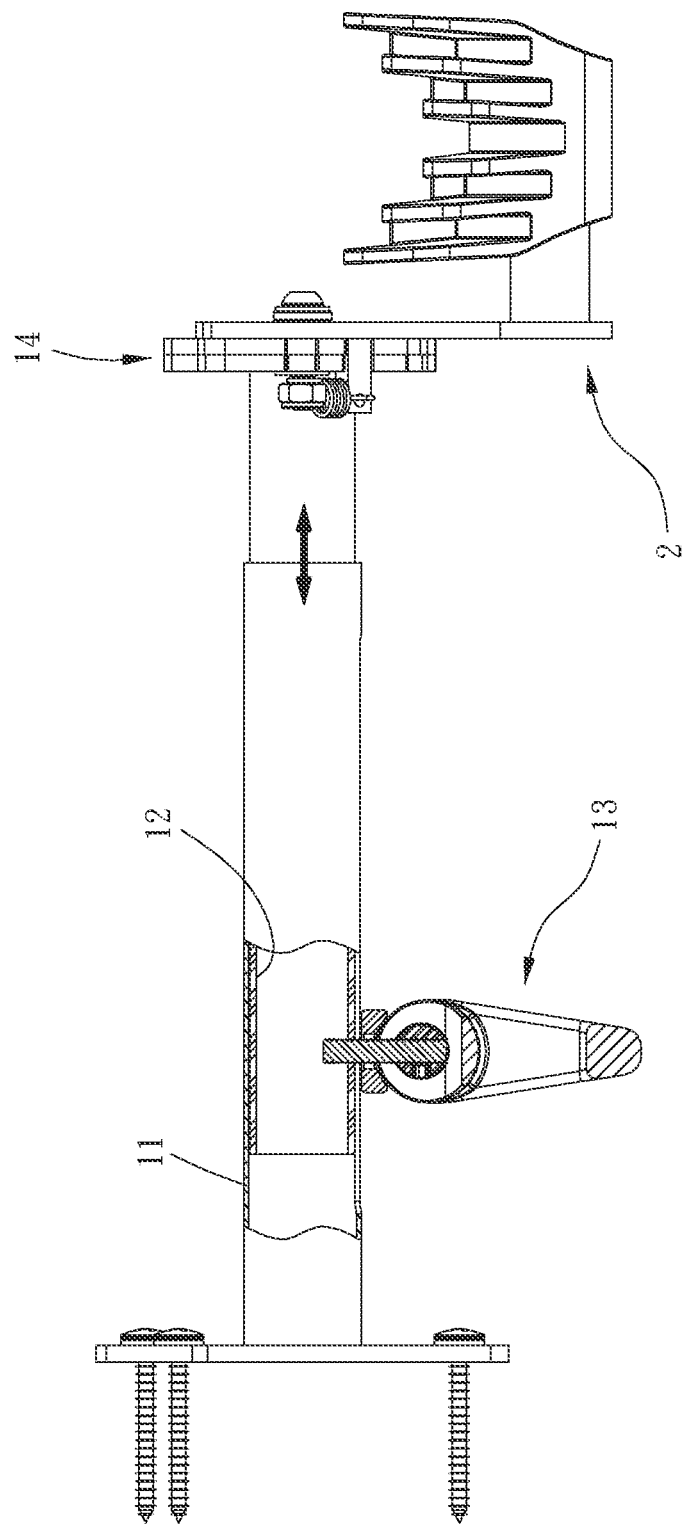
Figure 10:
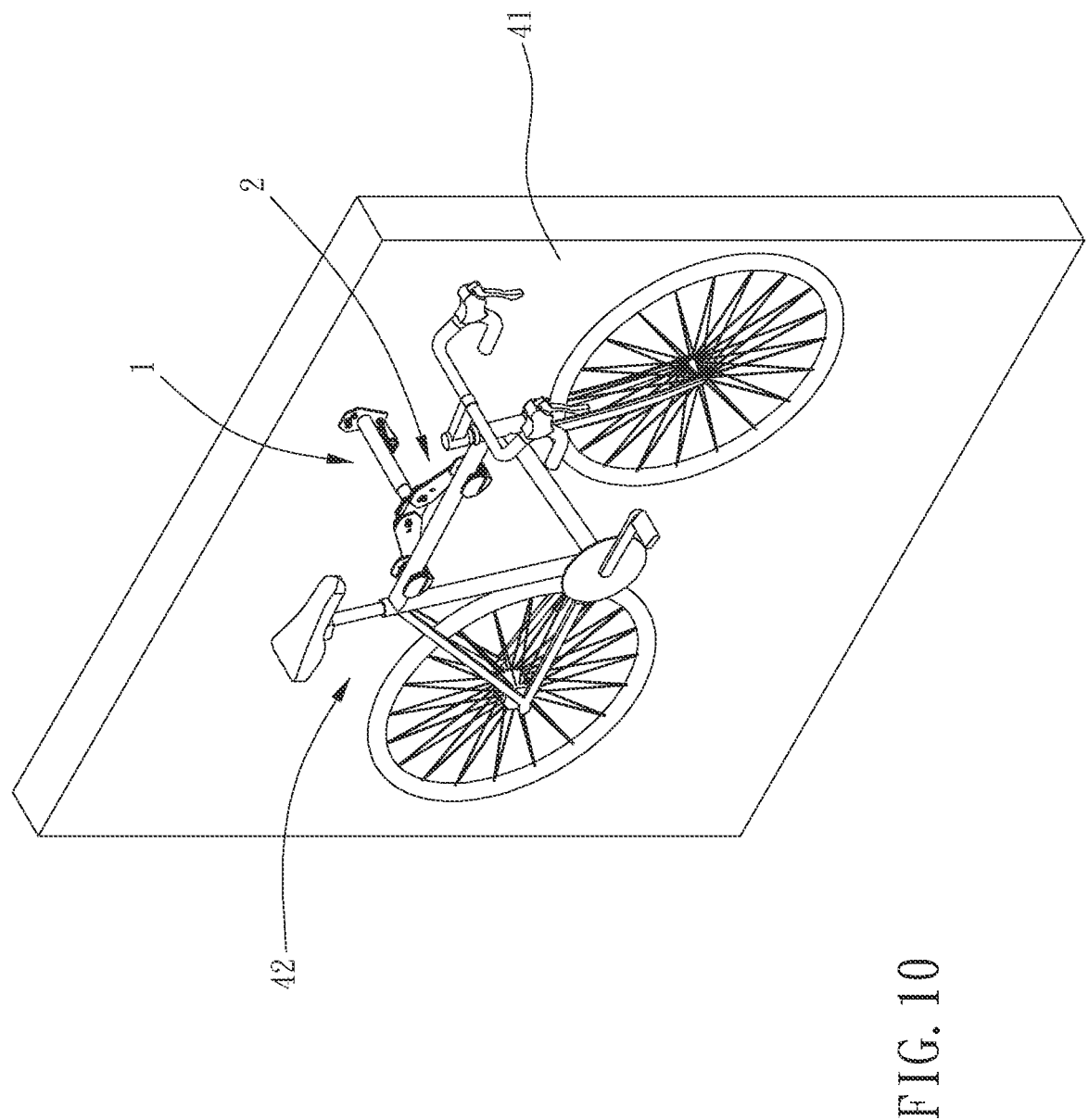
FIG. 10 is a drawing showing a bicycle hanger in use according to a preferable embodiment of the present invention.

Please refer to FIGS. 1 to 10 for a preferable embodiment of the present invention. A bicycle hanger of the present invention includes a base 1 and two supporting units 2.

The base 1 is configured to be mounted to an object 41 such as a wall, bicycle rack, bicycle frame or the like. The two supporting units 2 are connected to the base 1. Each of the two supporting units 2 includes a supporting arm 21, a plurality of positioning notches 25, a positioning member 26 and an elastic member 27. Each said supporting arm 21 is rotatably connected to the base 1 by a pivot member 3 and configured to support at least one bicycle 42. One of the base 1 and the supporting arm 21 includes the plurality of positioning notches 25, the other of the base 1 and the supporting arm 21 includes the positioning member 26. The plurality of positioning notches 25 are angularly arranged in interval relative to the pivot member 3, and the positioning member 26 is radially movable relative to the plurality of positioning notches 25 the pivot member 3 and releasably engageable within one of the plurality of positioning notches 25. When the positioning member 26 is engaged within the positioning notch 25, the supporting arm 21 is positioned in position relative to the base 1; when the positioning member 26 is disengaged from the positioning notch 25, the supporting arm 21 is swingable relative to the base 1.

An end of the elastic member 27 is connected with the positioning member 26, and another end of the elastic member 27 is connected with one of the base 1, the supporting arm 21 and the pivot member 3. For example, the another end of the elastic member 27 is connected directly with the pivot member 3 so as to bias the positioning member 26 in a direction toward the plurality of positioning notches 25 so that the positioning member 26 can be engaged stably within the positioning notch 25.

In this embodiment, the positioning member 26 is positioned to and movable with the supporting arm 21 so that the supporting arm 21 is movable for adjustment. Specifically, the supporting arm 21 includes a slot 23, and the pivot member 3 is mounted to the base 1 and inserted within the slot 23 so that the supporting arm 21 is adjustably movable relative to the base 1.

Preferably, each of the two supporting units 2 further includes an anti-slip washer 28 sleeved around one said pivot member 3 and abutted against one said supporting arm 21, which increases friction between the supporting arm 21 and the base 1 for stability of the supporting arm 21. The anti-slip washer 28 and the elastic member 27 provide multi-safety mechanism.

Specifically, the base 1 further includes a base portion 14 and two sleeves 15 which are connected with the base portion 14. The two sleeves 15 protrude from the base portion 14, and each of the two sleeves 15 is slidable within one said slot 23. Each said pivot member 3 is disposed through one said sleeve 15 and connected to the base portion 14 and the supporting arm 21. The sleeve 15 can protects the pivot member 3. Specifically, the pivot member 3 includes a threaded rod 31, a nut 32 and two metal washers 33. The threaded rod 31 is disposed through the two metal washers 33, the anti-slip washer 28 and the sleeve 15 to be screwed with the nut 32. The anti-slip washer 28 is disposed between one of the two metal washers 33 and the base portion 14, and the other of the two metal washers 28 is abutted on a side of the base portion 14 opposite to the supporting arm 21. The elastic member 27 is connected to the threaded rod 31 and clamped between the nut 32 and the further a metal washer 33.

In this embodiment, the base 1 is made of metal to have strong structural strength and is durable, and the anti-slip washer 28 is made of rubber to have sufficient friction. Preferably, the anti-slip washer 28 is disc-shaped and has a diametric dimension larger than a diametric dimension of the sleeve 15, and the anti-slip washer 28 has a thickness larger than two times a thickness of the metal washer 33.

The supporting arm 21 includes an arm portion 22 and a supporting member 24. One end of the arm portion 22 is swingably connected to the base 1, and the supporting member 24 is connected to another end of the arm portion 22. The arm portion 22 includes the slot 23, and the supporting member 24 is made of rubber for avoiding damage to the surface of the bicycle 42.

The base portion 14 includes a first plate member 141 and a second plate member 142. The first plate member 141 and the second plate member 142 correspond to each other in shape. The first plate member 141 and the second plate member 142 are assembled to form the base portion 14, which is easy to manufacture. Preferably, the first plate member 141 includes a plurality of first connection portions 143, the second plate member 142 includes a plurality of second connection portions 144, and the plurality of first connection portions 143 and the plurality of second connection portions 144 are positioned with each other by insertion, which prevents relative rotation of the first plate member 141 and the second plate member 142.

In this embodiment, the plurality of positioning notches 25 are disposed at a periphery of the base 1, and each of the plurality of positioning notches 25 is radially open in a direction away from the pivot member 3. Each of the plurality of positioning notches 25 and the positioning member 26 are non-circular and have respective shapes matching with each other, thus providing good stability. For example, each of the plurality of positioning notches 25 is U-shaped, the positioning member 26 is cuboid, and the each of the plurality of positioning notches 25 and the positioning member 26 preferably match with each other in size.

Preferably, each of the two supporting units 2 further includes a blocking member 29. When the positioning member 26 of one said supporting arm 21 is disengaged from one of the plurality of positioning notches 25, and the blocking member 29 blocks the positioning member 26 in a direction around the pivot member 3. In this embodiment, the blocking member 29 is protrusive radially beyond the periphery of the base 1, for sufficiently blocking the supporting arm 21.

The base 1 further includes a main body 11, a retractable member 12 and an urging mechanism 13. The main body 11 is configured to be mounted to the object 41, the retractable member 12 is movably connected with the main body 11, and the urging mechanism 13 is disposed on the main body 11 and operable to urge and position the main body 11 and the retractable member 12, wherein the length of the retractable member 12 is adjustable according to various requirements.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bicycle hanger, including:
a base, configured to be mounted to an object; and
two supporting units, connected to the base, each of the two supporting units including a supporting arm, a plurality of positioning notches, a positioning member and an elastic member, each said supporting arm being rotatably connected to the base by a pivot member, one of the base and the supporting arm including the plurality of positioning notches, the other of the base and the supporting arm including the positioning member, the plurality of positioning notches being angularly arranged in interval relative to the pivot member, the positioning member being radially movable relative to the pivot member and releasably engageable within one of the plurality of positioning notches, an end of the elastic member being connected with the positioning member, another end of the elastic member being connected with one of the base, the supporting arm and the pivot member, the elastic member biasing the positioning member radially and inwardly;
wherein the positioning member is positioned to and movable with the supporting arm, the supporting arm includes a slot, and the pivot member is mounted to the base and inserted within the slot so that the supporting arm is adjustably movable relative to the base;
wherein the base further includes a base portion and two sleeves which are connected with the base portion, the two sleeves protrude from the base portion, each of the two sleeves is slidable within one said slot, and each said pivot member is disposed through one said sleeve and connected to the base portion and the supporting arm.

2. The bicycle hanger of claim 1, wherein the plurality of positioning notches are disposed at a periphery of the base, and each of the plurality of positioning notches is radially open in a direction away from the pivot member.

3. The bicycle hanger of claim 2, wherein each of the plurality of positioning notches and the positioning member are non-circular and have respective shapes matching with each other.

4. The bicycle hanger of claim 1, wherein the base further includes a main body, a retractable member and an urging mechanism, the main body is configured to be mounted to the object, the retractable member is movably connected with the main body, and the urging mechanism is disposed on the main body and operable to urge and position the main body and the retractable member.

5. The bicycle hanger of claim 1, wherein the elastic member is connected directly to the pivot member.

6. The bicycle hanger of claim 1, wherein each of the two supporting units further includes an anti-slip washer sleeved around one said pivot member and abutted against one said supporting arm.

7. The bicycle hanger of claim 1, wherein each of the two supporting units further includes a blocking member, and when the positioning member of one said supporting arm is disengaged from one of the plurality of positioning notches, and the blocking member blocks the positioning member in a direction around the pivot member.

8. The bicycle hanger of claim 1, wherein the plurality of positioning notches are disposed at a periphery of the base, and each of the plurality of positioning notches is radially open in a direction opposite to the pivot member; each of the plurality of positioning notches and the positioning member have respective shapes matching with each other; the base further includes a main body, a retractable member and an urging mechanism, the main body is configured to be mounted to the object, the retractable member is movably connected with the main body, and the urging mechanism is disposed on the main body and operable to urge and position the main body and the retractable member; the elastic member is connected directly to the pivot member; each of the two supporting units further includes an anti-slip washer sleeved around one said pivot member, abutted against one said supporting arm; each of the two supporting units further includes a blocking member, and when the positioning member of one said supporting arm is disengaged from one of the plurality of positioning notches, and the blocking member blocks the positioning member in a direction around the pivot member; each of the plurality of positioning notches is U-shaped; the positioning member is cuboid; the supporting arm includes an arm portion and a supporting member, one end of the arm portion is swingably connected to the base, the supporting member is connected to another end of the arm portion, the arm portion includes the slot, the supporting member is made of rubber; the base is made of metal, and the anti-slip washer is made of rubber; the pivot member includes a threaded rod, a nut and two metal washers, the threaded rod is disposed through the two metal washers, the anti-slip washer and the sleeve to be screwed with the nut, the anti-slip washer is disposed between one of the two metal washers and the base portion, the other of the two metal washers is abutted on a side of the base portion opposite to the supporting arm, and the elastic member is connected to the threaded rod and clamped between the nut and the other of the two metal washers; the anti-slip washer is disc-shaped and has a diametric dimension larger than a diametric dimension of the sleeve; the anti-slip washer has a thickness larger than two times a thickness of the metal washer; the blocking member is protrusive radially beyond the periphery of the base; the base portion includes a first plate member and a second plate member, the first plate member and the second plate member correspond to each other in shape, the first plate member includes a plurality of first connection portions, the second plate member includes a plurality of second connection portions, and the plurality of first connection portions and the plurality of second connection portions are positioned with each other by insertion.

* * * * *